United States Patent Office 3,368,620
Patented Feb. 13, 1968

3,368,620
OIL RECOVERY PROCESS
Robert R. Harvey, Bartlesville, Okla., assignor to Phillips Petroleum Company, a corporation of Delaware
No Drawing. Filed June 18, 1965, Ser. No. 465,165
10 Claims. (Cl. 166—9)

ABSTRACT OF THE DISCLOSURE

Oil is produced from an oil stream by forming a bank of vacuoles comprising double-walled globules of an ester of a fatty acid of 12 to 20 carbon atoms and a polyhydric alcohol (a glycol or a glycerol) and water around an injection well and driving the bank of vacuoles toward an offset production well so as to displace oil thereinto, leaving the stratum of oil wet, and the displaced oil is recovered from the production well.

This invention relates to a process for recovering oil by fluid drive.

It is a conventional procedure in the petroleum industry to displace and drive oil from an oil-bearing stratum by fluid drive. One of the major problems encountered in recovery operations by liquid displacement, using water, surfactant flood, mixed surfactants and the like in channeling. This problem is the result of flow patterns established by the flooding vehicle in seeking the least flow resistant paths in the oil-bearing stratum. As a result, sections of the stratum containing recoverable and often considerable amounts of oil are bypassed by the flood and are not produced. Numerous methods, each applicable to some particular sub-surface condition, have been used to minimize channeling and to maximize the sweep efficiency of the flooding vehicle.

This invention is concerned with an improved process for recovering oil from an oil-bearing stratum by fluid drive which minimizes channeling and results in the production of a larger percentage of the oil in a stratum.

Accordingly, it is an object of the invention to provide a process for recovering oil by liquid drive and displacement. Another object is to provide a liquid drive process using vacuoles as an oil displacing and driving agent. A further object is to provide an improved water flooding technique. It is also an object of the invention to provide a liquid drive process which requires less injection pressure and improves the recovery of oil. Another object is to avoid channeling in a liquid drive process in an oil-bearing stratum. Other objects of the invention will become apparent to one skilled in the art upon consideration of the accompanying disclosure.

A broad aspect of the invention comprises establishing a bank of vacuoles of a fatty acid ester of a polyhydric alcohol and water around an injection well penetrating an oil-bearing stratum; driving the bank of vacuoles toward an offset production well penetrating the stratum so as to substantially oil-denude the stratum traversed by the bank of vacuoles and produce oil in the production well; and recovering the oil from the production well by pumping, gas lift, or other conventional means.

The esters required are immiscible with water and are formed from fatty acids containing from 12 to 20 carbon atoms and glycol or glycerol as the alcohol. The production of vacuoles is the direct result of coacervation, a complex type of coagulation of a colloidal suspension brought about by changes in temperature, pH, addition of salts, or by addition of another colloid. Reference is made to the publication by H. R. Kruyt, ed., "Colloid Science," Elsevier Publ. Co., N.Y., 1949, vol II, pp. 460–463, which provides some discussion of vacuole formation and the nature of the vacuoles. Vacuoles can be produced from certain colloidal sols and can be induced within an oil-bearing porous medium such as sand.

I have found that colloidal suspension of fatty acid esters of polyhydric alcohols undergo vacuolation or vacuole formation when introduced into a reservoir sample such as Burbank sand. Particularly effective are glycerol monostearate and glycer mono-oleate as well as the corresponding glycol esters. However, any substance or combination of substances which undergo vacuole formation are usable in the procedure of the invention. The colloidal suspensions in water are introduced into the stratum in the usual manner of water-flooding and vacuole formation is induced in the pores of the stratum, forming a vacuole bank which is driven thru the stratum by a bank or slug of water with good sweep efficiency, displacing in its progress a major portion to nearly all of the residual oil left after primary and/or secondary recovery methods, particularly water flooding.

Alternatively, the vacuole producing substances may be introduced into the stratum by absorbing them on hydrophobic particles such as carbon black, talc, non-swelling kaolin, porous cellular material such as dead bacteria, etc., and suspending these in water for injection into the stratum. Another technique comprises dissolving the vacuole producers in oil or other appropriate solvent such as ether and injecting the solution into the stratum followed by conventional water drive.

When the selected ester is dissolved in a suitable solvent such as crude oil, the concentration of the ester is preferably about 1 weight percent but may be in the range of 0.5 to 5 or more weight percent. The slug of solution injected should be at least 0.1 pore volume of the stratum involved in the drive and may run as high as one or more pore volume, depending upon the character of the stratum and the economics involved. After injection of the solution into the stratum, water which may be substantially free of salt or contain a minor amount of salt is injected behind the solvent slug and vacuole formation takes place at the water-solvent interface, resulting in a bank of vacuoles in this region which are then driven thru the stratum by the following slug of water. The technique is particularly applicable to a stratum which has been water flooded or which contains a substantial concentration of connate water. In this reservoir condition, the injection of the solution of the ester results in vacuole formation at the interface of the solvent and the in-place water.

When utilizing a solid particulate carrier material for the vacuole forming agent (ester) the carrier should have a particle size in the range of 0.001 to 1.5 microns. The ester is adsorbed by the carrier particles by simply mixing the particles with the ester and forming a slurry or suspension of the particles in an aqueous medium injecting same into the stratum where the vacuole forming agent is gradually released by the carrier particles and forms vacuoles in contact with the water, thus forming a vacuole bank which is then driven thru the stratum by water flooding.

Another technique comprises forming a solution of the ester in oil or other water-immiscible solvent and absorbing the solution on an oleophilic particulate carrier such as carbon black, dispersing the carrier particles in an aqueous medium to form a suspension or dispersion and injecting the resulting suspension into the stratum where the ester is gradually released to the contacting ester and forms a bank of vacuoles.

A vacuole is not a bubble of foam but is rather a unique globule of ester and water, the ester forming a double wall around a core of water with water occupying the space between the double walls. There is no free gas in the vacuole in the form of a bubble. These vacuoles have a surprising effect on an oil-bearing stratum in that they displace the oil and leave the sand or rock in an oil-wet condition. This phenomena is a substantial aid in oil production because much less pressure is required to drive the vacuole bank thru the stratum than is required in other liquid drive processes. In techniques which leave the sand or rock water wet, at least 5 and even 10 times as much injection pressure is required to drive the liquid thru the stratum than is required in driving a vacuole bank therethru. Very little is understood as to the exact manner in which the vacuoles displace and drive the oil but it has been observed that the sand is substantially completely cleaned of the oil, leaving the sand a light tan color.

Considerable study was made of some aspects of vacuole formation and the effect produced by driving vacuoles thru an oil sand. In one study, a drop of glycerol mono-oleate was placed on top of a drop of water and a photomicrograph in color was prepared. The formation of a bank of vacuoles along one area of the drop was observed. These vacuoles appeared to be small bubbles. A portion of the picture showed wavy furrows which represented portions of collapsed glycerol mono-oleate film at the air-olein interface. In one portion of the picture where the olein layer contacted the water, the vacuoles were seen forming and breaking off the main mass. More enlarged pictures in color were made of the vacuole bank and the adjoining aqueous phase and the vacuoles could be seen to resemble the illustrations in K. R. Kruyt's book referred to supra. It can be seen that the water is both enclosed within the vacuoles formed by the mono-oleate coacervate and is the medium in which the vacuoles are moving.

A study was made of vacuole movement in Burbank sand. In this study, microcells filled with Burbank sand were prepared. The microcells were made from 3" by 1" standard slides with a space of 15 mils between them. The spacing was established by a flat polyethylene bar 15 mils thick and ⅟₁₆" wide. The slides were glued together at the edges with an epoxy resin. The 15 mil space was filled with Burbank oil-wet sand and the feed was saturated with Burbank crude oil and flooded to oil residual with simulated Burbank produced water (about 5.0 weight percent salt). A flow path in and out of the cell was provided thru hypodermic needles at opposite ends of the slides. In order to provide uniform flow over the cross section of the microcells, distribution bars 10 mils thick were positioned at both ends of the sand. The pore volume of the cells was approximately 0.5 cc.

Bright areas in the microslide photograph indicated portions emptied of oil by the water flood while yellow areas represented residual oil left in unswept portions and oil on the surface of translucent grains. It was obvious that a very small amount of oil was removed by the water flood. A slug of oil containing 1 weight percent glycerol mono-oleate was injected thru the inlet end of the slide and injection was continued until the barrier line between the injected oil containing the vacuole former and the residual oil was moved to near the center of the slide. A microphotograph in color at this stage clearly showed the vacuole formation and even the double walled structure of the vacuoles. The sand as far as the vacuoles had progressed, i.e., up to the barrier line was a clean tan color while the residual oil area beyond the barrier line was practically black with a few light spots representing pores from which oil had been removed by the water flood. Produced water was used to drive the injected oil thru the sand.

Photomicrographs taken later at the downstream end of the slide showed the penetration of the vacuoles. It could be seen that most of the oil had been displaced by the bank of vacuoles. Another photomicrograph of greater magnification concentrated on one of the pore spaces showed the vacuole penetration in greater detail.

Another photomicrograph showed the sand swept by the vacuoles and further flushed with additional water. The clean appearance of the sand grains showed the mobility of the vacuole bank. Many of the sand grains appeared white, indicating the removal of oil above and below them. Where traces of residual oil remained, the oil-wet contact angle showed, indicating that there was no permanent change in wettability.

Thus, driving a vacuole bank and water thru a stratum produces substantially all of the oil from the stratum, does not change the oil-wet nature of the sand or rock, and requires far lessing driving pressure than other liquid drive processes. The sweep efficiency and the oil recovery are also optimum.

Certain modifications of the invention will become apparent to those skilled in the art and the illustrative details disclosed are not to be construed as imposing unnecessary limitations on the invention.

I claim:

1. A process for recovering oil from an oil-bearing stratum penetrated by an injection well and an offset production well which comprises the steps of:
   (1) establishing a bank of vacuoles of a fatty acid ester of a polyhydric alcohol and water around said injection well, said fatty acid containing from 12 to 20 carbon atoms and said alcohol being a glycol or glycerol;
   (2) driving the bank of step (1) toward said production well so as to substantially oil-denude the stratum traversed by the bank of vacuoles, leaving the stratum oil-wet, and produce oil in said production well; and
   (3) recovering oil from said production well.

2. The process of claim 1 wherein said ester is glycerol mono-oleate.

3. The process of claim 1 wherein said ester is glycerol monostearate.

4. A process for recovering oil from an oil-bearing stratum penetrated by an injection well and an offset production well which comprises the steps of:
   (1) dissolving an ester of a fatty acid having 12 to 20 carbon atoms and a glycol or a glycerol in an oil in an ester concentration in the range of 0.5 to 5 weight percent;
   (2) injecting a slug of the solution of step (1) into said stratum thru said injection well, said slug being at least 0.1 pore volume;
   (3) contacting the slug of step (2) within said stratum with water so as to form a bank of vacuoles comprising double-walled globules of said ester and water at the interface of the slug of step (1) and said water;
   (4) driving said bank of vacuoles thru said stratum toward said production well so as to displace and drive oil thru said stratum into said production well, leaving said stratum oil-wet; and
   (5) recovering the produced oil from said production well.

5. The process of claim 4 wherein said bank of vacuoles is driven thru said stratum by water drive.

6. The process of claim 4 wherein the water in step (3) is water in place in the stratum prior to step (2).

7. The process of claim 4 wherein said ester is glycerol monostearate.

8. The process of claim 4 wherein said ester is glycerol mono-oleate.

9. A process for recovering oil from an oil-bearing stratum penetrated by an injection well and an offset production well which comprises the steps of:
   (1) dissolving an ester of a fatty acid having 12 to 20 carbon atoms and a glycol or a glycerol in an oil in an ester concentration in the range of 0.5 to 5 weight percent;
   (2) mixing 0.001 to 1.5 micron size solid carrier particles with the solution of step (1) to form a slurry thereof;
   (3) injecting the slurry of step (2) into said stratum thru said injection well, said slurry amounting to at least 0.1 pore volume;
   (4) contacting the injected slurry of step (3) within the stratum with water so as to form a bank of vacuoles comprising double-walled globules of said ester and water;

(5) driving said bank of vacuoles of step (4) thru said stratum toward said production well so as to displace and drive oil thru said stratum into said production well; and (6) recovering the produced oil from said production well.

10. A process for recovering oil from an oil-bearing stratum penetrated by an injection well and an offset production well which comprises the steps of:

(1) dissolving an ester of a fatty acid having 12 to 20 carbon atoms and a glycol or a glycerol in an oil in an ester concentration in the range of 0.5 to 5 weight percent;

(2) absorbing the solution of step (1) on 0.001 to 1.5 mircon size oleophilic carrier particles and forming an aqueous suspension of the resulting particles;

(3) injecting a slug of the suspension of step (2) into said stratum thru said injection well to form a bank of vacuoles therein;

(4) injecting a following driving fluid to drive said bank of vacuoles thru said stratum toward said production well so as to displace and drive oil thru said stratum into said production well; and (5) recovering the oil thus produced.

References Cited
UNITED STATES PATENTS

| | | | |
|---|---|---|---|
| 2,742,089 | 4/1956 | Morse et al. | 166—9 |
| 3,126,952 | 3/1964 | Jones | 166—9 |
| 3,131,759 | 5/1964 | Slusser | 166—9 X |
| 3,170,514 | 2/1965 | Harvey et al. | 166—9 |
| 3,220,473 | 11/1965 | Holm | 166—9 |

CHARLES E. O'CONNELL, *Primary Examiner.*

JAMES A. LEPPINK, *Examiner.*